July 7, 1942.  C. S. ASH  2,289,165
DUAL WHEEL VEHICLE
Original Filed April 1, 1938
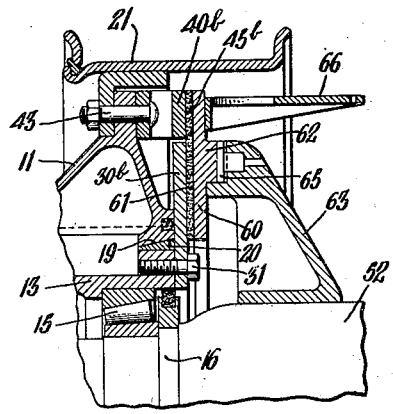
Fig. 5.
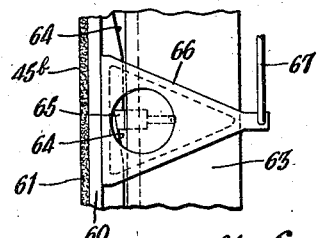
Fig. 6.
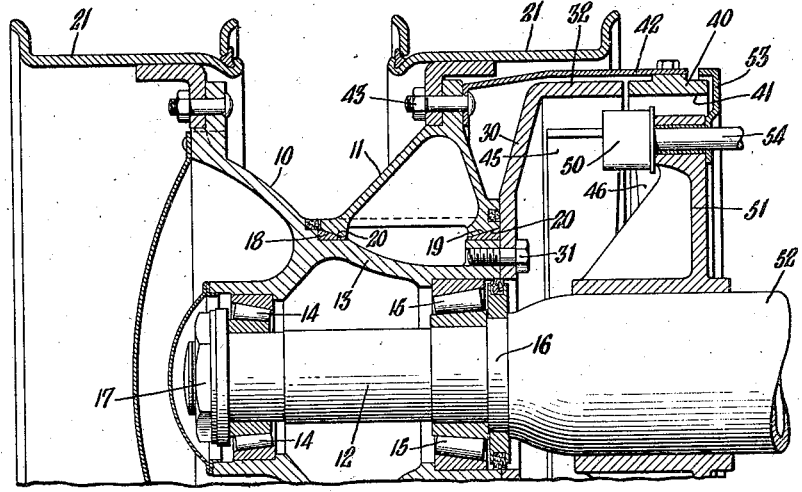
Fig. 1.
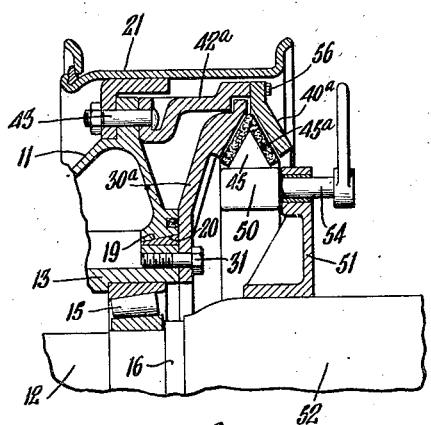
Fig. 2.
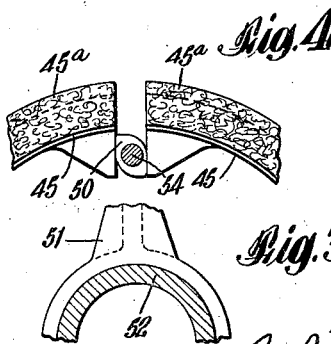
Fig. 4.
Fig. 3.
INVENTOR.
C. S. Ash
BY Morgan Finnegan and Durham
ATTORNEYS.

Patented July 7, 1942

2,289,165

UNITED STATES PATENT OFFICE 2,289,165

DUAL WHEEL VEHICLE

Charles S. Ash, Milford, Mich.

Application April 1, 1938, Serial No. 199,408
Renewed August 26, 1939

9 Claims. (Cl. 188—18)

The present invention relates to novel and improved dual wheel braking means, and more particularly to a braking means for braking each of two independently rotatable wheels mounted side by side.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawing, referred to herein and constituting a part hereof, illustrates three embodiments of the invention, and together with the description, serves to explain the principles of the invention.

Of the drawing:

Figure 1 is a fragmentary vertical section showing an embodiment of the present invention as applied to a trailing or undriven axle;

Figure 2 is a similar view of a modified embodiment of the present invention;

Figure 3 is a fragmentary end elevation of a form of brake actuating device suitable for use with the embodiment of Figure 1 or 2;

Figure 4 is a fragmentary end elevation of a brake anchor also usable in connection with the foregoing embodiments;

Figure 5 is a fragmentary vertical elevation of a further modification of the present invention; and Figure 6 is a fragmentary vertical section of a form of brake operating device suitable for use with the modified embodiment of Figure 5.

The present invention has for its object the provision of independently braked, independently rotatable dual wheels such as are suitable for use in connection with automotive vehicles and semi-trailers. A further object is the provision of an improved braking system for independently rotatable dual wheels in which the braking mechanism need not be disturbed to permit the removal of one or both of the independently rotatable dual wheels. A further object is the provision of a brake mechanism for independently rotatable wheels in which the brakes for the two wheels are positioned closely adjacent to each other and are positive and direct in their action on both wheels.

In accordance with the present invention as illustratively embodied, there are provided independently rotatable dual wheels which normally roll over the road independently of each other so that in turning corners, as well as in travelling on a straight road with the wheels unequally inflated or loaded, the two wheels may roll freely on the road with no tendency to drag, thereby greatly increasing the tire life, and these independently rotatable wheels are individually braked by positive direct acting means positioned closely adjacent to the inner side of the wheels to that the wheels may be removed without disturbing the mounting of the brake mechanism on its anchor plate.

It has heretofore been proposed to provide a clutch mechanism between the two independently rotatable wheels, and to energize the clutch by or simultaneously with the application of a brake to the inner wheel. It has also been proposed to provide separate brakes for the wheels, one of the brakes being mounted on the outer end of the axle, while the other brake is mounted on the axle at the inner side of the wheels. It has also been proposed to mount the brakes for the two wheels between the wheels and to secure the brakes to the axle at this point. Each of these prior solutions to the problem of braking independently rotatable dual wheels has disadvantages which are avoided by the present invention, as the present invention permits the dual wheels to be easily and quickly removed without disturbing the adjustment of any of the braking parts, the overall length of the bearings and axle end can be reduced, and the invention is applicable to both live and dead axles.

It will be understood that the foregoing general description and the following detailed description as well, are exemplary and explanatory of the invention but are not restrictive thereof.

Referring now in detail to the illustrative embodiment of the present invention shown in Figure 1 of the drawing, there are provided two independently rotatable wheels 10, 11 which are freely rotatable on the axle end 12. Wheel 10 is formed with an elongated and inwardly extending hub 13, interiorly shaped to receive the outer races of tapered roller bearings 14 and 15, which are received on the bearing seats of the axle end 12 and are retained thereon by the shoulder 16 and the retaining nut 17. The outer portion of the hub 13 is formed with tapered bearing surfaces 18 and 19 upon which are telescopically seated the inner faces 20 of the hub for the inner wheel 11, and these bearing surfaces 18 and 19 are preferably formed of graphite bronze or some similar material not requiring frequent lubrication. Conventional tire supporting rims 21 are secured to each of the wheels 10 and 11 in the usual manner.

The braking means for the dual wheels comprises brake drums 30 and 40. Brake drum 30 is bolted to the hub 13 of the outer wheel by bolts 31 and extends outwardly therefrom to a cylindrical portion 32, while brake drum 40 comprises an annular member 41 bolted to a cylindrical supporting member 42 which is attached to the inner wheel 11 by means of the bolts 43. Drums 30 and 40 are preferably of the same diameter and of equal effective width, so that the braking effect on both wheels is equal.

The brake shoes may be of generally conventional construction but are separately anchored and are separately actuated from a common actuator. As embodied, the brake shoes 45 and 46 are mounted on the axle, side-by-side in axial alinement, and are adapted to be forced against their respective brake drums 30 and 40. Between the ends of the brake shoes 45 and 46, and adapted to operate on both sets of shoes, is an operating cam 50 which is rotatably supported by shaft 54 journalled in arm 51 extending radially from the axle 52 and supported thereon. A brake cover plate 53 is secured to the arm 51 and serves to keep dust out of the brake mechanism.

As the brake operating cam 50 is rotated to expand the brake shoes 45 and 46 outwardly and into contact with the brake drums 30 and 40, the wheels are retarded in their rotation, and this retarding force is applied independently. Thus, if either wheel slides on the road, the braking of the other wheel is in no way affected, and so long as the wheels continue to turn they may rotate independently of each other, thereby permitting independent rotation of the wheels on turns with the brakes applied.

Figure 2 illustrates a modified embodiment of the invention in which the separate brake drums 30a and 40a for the wheels 10 and 11, respectively, are adapted to cooperate with a common brake shoe 45a. In this embodiment, the brake drums are conical disk-like members, increasing in diameter towards each other, drum 30a being mounted directly on the wheel hub 13, while drum 40a is mounted on the cylindrical member 42a by bolts 56. The brake shoe 45a is an annular member V-shaped in cross section, and is positioned centrally between the brake drums, so that when it is expanded it contacts with both drums equally.

Figures 5 and 6 of the drawing illustrate a further modification of the invention in which the brakes for the two wheels comprise a narrow radially-extending ring secured to each wheel and adapted to be engaged by a common brake surface which is radially extending and is adapted to be moved axially of the axle by rotary movement. As embodied, the brake ring 30b is secured to the wheel hub 13, and the brake ring 40b for the inner wheel is secured to its wheel 11 by means of the bolts 43. These rings are of unequal diameter but are preferably formed and dimensioned so as to have approximately the same braking area. The common cooperating braking member 45b comprises a radially extending disc 60, provided with a facing of brake lining 61, and an annular shoulder 62 by which the ring is supported on a plurality of arms 63 extending from the axle 52 and supported thereon. The annular shoulder 62 is preferably formed with a plurality of teeth-like cam surfaces 64 which engage wedge shaped projections 65 extending outwardly from the arms 63, and an inwardly extending arm 66 fastened to the brake member 45b serves to rotate the brake member 45b and thereby move it axially into and out of contact with the brake rings 30b and 40b, and arm 66 may be actuated by any suitable means such as the brake rod 67. Engagement of the rotating braking surfaces 30b and 40b with surface 45b, as the brake is applied, causes a tendency of surface 45b to move angularly, thereby moving it axially by reason of the inclined surfaces 64 and 65. This axial movement, with the wheels moving upwardly (Fig. 6), increases the braking pressure through the continued rotation of the wheels over that pressure caused by the movement of the surface 45b through actuation of rod 67.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheeled assembly including in combination an axle, a pair of wheels independently rotatable at the end thereof, a brake element for each wheel, a common friction element for frictionally engaging the brake elements to retard the rotation of the wheels, said friction means being located on the inner side of the wheels whereby the wheels may be removed without disturbing the friction means.

2. A dual wheeled assembly including in combination an axle, a wheel having an elongated hub rotatable on an end thereof, a second wheel rotatably mounted on the elongated hub whereby the wheels may rotate independently, a brake drum fixed to the inner side of the elongated hub, a second brake drum fixed to the inner side of the second wheel, said brake drums being in axial alinement, and a common friction element engageable with both drums and operating independently on the drums to retard rotation of both wheels.

3. A dual wheeled assembly including in combination an axle, a wheel thereon having an inwardly extending hub, a second wheel rotatably mounted on the hub of the first wheel for rotation independently thereof, a brake element fixed to the inner side of the first wheel hub, a brake element fixed to the inner side of the second wheel, said brake elements being closely adjacent to each other, and a common braking element engageable with the brake elements to retard rotation of the wheels, said wheels being removable from the axle without disturbing the friction means.

4. A dual wheeled assembly including in combination an axle, a wheel thereon having an inwardly extending hub, a second wheel rotatably mounted on the hub of the first wheel for rotation independently thereof, a brake element fixed to the inner side of the first wheel hub, a brake element fixed to the inner side of the second wheel, said braking elements being coaxial, and a common braking element engageable with the brake elements to retard rotation of the wheels, said wheels being removable from the axle without disturbing the friction means.

5. A dual wheeled assembly including in combination an axle, a pair of wheels independently rotatable at the end thereof, a brake element for each wheel, a common friction element for frictionally engaging the brake elements to retard the rotation of the wheels, said common friction element having limited rotational movement, and means for engaging the brake elements by such rotational movement of the common element whereby additional braking pressure may be created by continued rotation of the wheels.

6. A dual wheeled assembly including in combination an axle, a pair of wheels independently rotatable thereon, a brake element for each wheel, braking means engageable with the brake elements for retarding the rotation of the wheels, and means whereby the continued rotation of either wheel will cause an increased braking force between the braking means and the brake elements.

7. A dual wheeled assembly including in combination a pair of independently rotatable dual wheels, brake means for each wheel, means for actuating the braking means and means whereby the application of a braking force through the braking means increases the braking effort on both wheels.

8. A dual wheeled assembly including in combination an axle, a pair of wheels independently rotatable at the end thereof, an annular disk-like brake element connected to each wheel, said elements being positioned side by side and having inclined converging faces, and a common friction element to engage the inclined faces and retard rotation of the wheels.

9. A dual wheeled assembly including in combination an axle, a wheel thereon having an inwardly extending hub, a second wheel rotatably mounted on the hub of the first wheel for rotation independently thereof, an annular disk-like brake element fixed to the inner side of the first wheel hub, an annular disk-like brake element fixed to the inner side of the second wheel, said brake elements being positioned in side by side coaxial relationship and each element having an inclined braking surface, said surfaces converging on each other, and an annular friction element having converging surfaces to have frictional engagement with the brake elements.

CHARLES S. ASH.